US012774369B2

(12) United States Patent
Park

(10) Patent No.: US 12,774,369 B2
(45) Date of Patent: Oct. 27, 2026

(54) METHOD FOR MANUFACTURING FIRE-RESISTANT RESIN COMPOSITION, FIRE-RESISTANT MEMBER MANUFACTURED FROM FIRE-RESISTANT RESIN COMPOSITION, AND METHOD FOR MANUFACTURING FIRE-RESISTANT MEMBER

(71) Applicant: Gwang-Myeong Park, Busan (KR)

(72) Inventor: Gwang-Myeong Park, Busan (KR)

(73) Assignee: Gwang-Myeong Park, Busan (KR)

( * ) Notice: Subject to any disclaimer, the term of this patent is extended or adjusted under 35 U.S.C. 154(b) by 70 days.

(21) Appl. No.: 18/784,123

(22) Filed: Jul. 25, 2024

(65) Prior Publication Data

US 2026/0002002 A1 Jan. 1, 2026

(30) Foreign Application Priority Data

Jun. 26, 2024 (KR) ........................ 10-2024-0083346

(51) Int. Cl.

| | |
|---|---|
| ***C08J 3/00*** | (2006.01) |
| ***B29C 48/00*** | (2019.01) |
| ***B29C 48/09*** | (2019.01) |
| ***B29C 48/15*** | (2019.01) |
| ***C08J 3/12*** | (2006.01) |
| *B29K 85/00* | (2006.01) |
| *B29K 483/00* | (2006.01) |
| *B29K 507/04* | (2006.01) |
| *B29L 23/00* | (2006.01) |

(52) U.S. Cl.

CPC ........... *C08J 3/005* (2013.01); *B29C 48/0022* (2019.02); *B29C 48/022* (2019.02); *B29C 48/09* (2019.02); *B29C 48/15* (2019.02); *C08J 3/12* (2013.01); *B29K 2085/00* (2013.01); *B29K 2483/005* (2013.01); *B29K 2507/04* (2013.01); *B29K 2995/0016* (2013.01); *B29L 2023/22* (2013.01)

(58) Field of Classification Search

CPC ... B29C 48/0022; B29C 48/022; B29C 48/09; B29C 48/15; B29K 2085/00; B29K 2483/005; B29K 2507/04; B29K 2995/0016; B29L 2023/22; C08J 3/005; C08J 3/12; C08J 3/203; C08J 2375/02; C08K 2003/323; C08K 5/32; C08K 5/053; H02G 3/0412; H02G 3/088; C08L 61/28; C08L 61/24

See application file for complete search history.

(56) References Cited

U.S. PATENT DOCUMENTS

2002/0058601 A1 * 5/2002 Jordan, IV .............. C04B 24/32 510/505

FOREIGN PATENT DOCUMENTS

| | | | | | |
|---|---|---|---|---|---|
| CN | 113234380 | A | * | 8/2021 | ............... B05D 7/14 |
| KR | 10-2004-0019114 | A | | 3/2004 | |
| KR | 10-0803466 | B1 | | 2/2008 | |
| KR | 10-1473260 | B1 | | 12/2014 | |
| KR | 20230086847 | A | * | 6/2023 | ................ F16L 5/04 |

OTHER PUBLICATIONS

English language translation of KR-20230086847-A (Year: 2023).*
English language translation of CN-113234380-A (Year: 2021).*

* cited by examiner

*Primary Examiner* — John M Cooney
(74) *Attorney, Agent, or Firm* — NSIP Law

(57) ABSTRACT

Disclosed is a method for manufacturing a fire-resistant resin composition, a fire-resistant member manufactured from the composition, and a method for manufacturing the fire-resistant member, wherein fire-resistant members are installed in a wire penetration hole of a wall structure and, in the event of a fire, foam and expand by the heat of the fire to prevent the spread of the fire across the wall structure.

4 Claims, 6 Drawing Sheets

【FIG. 1】
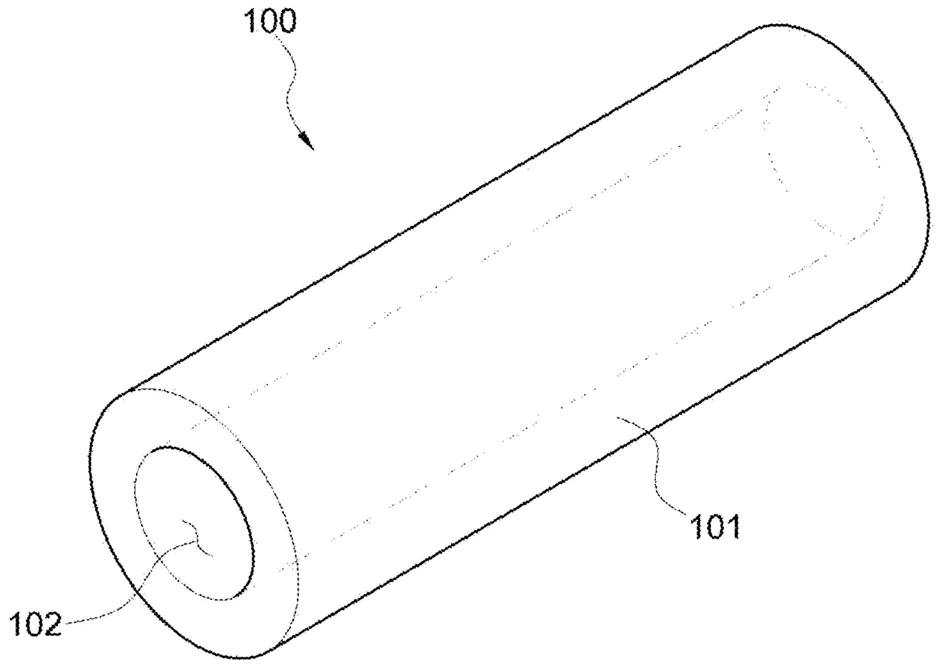

【FIG. 2】
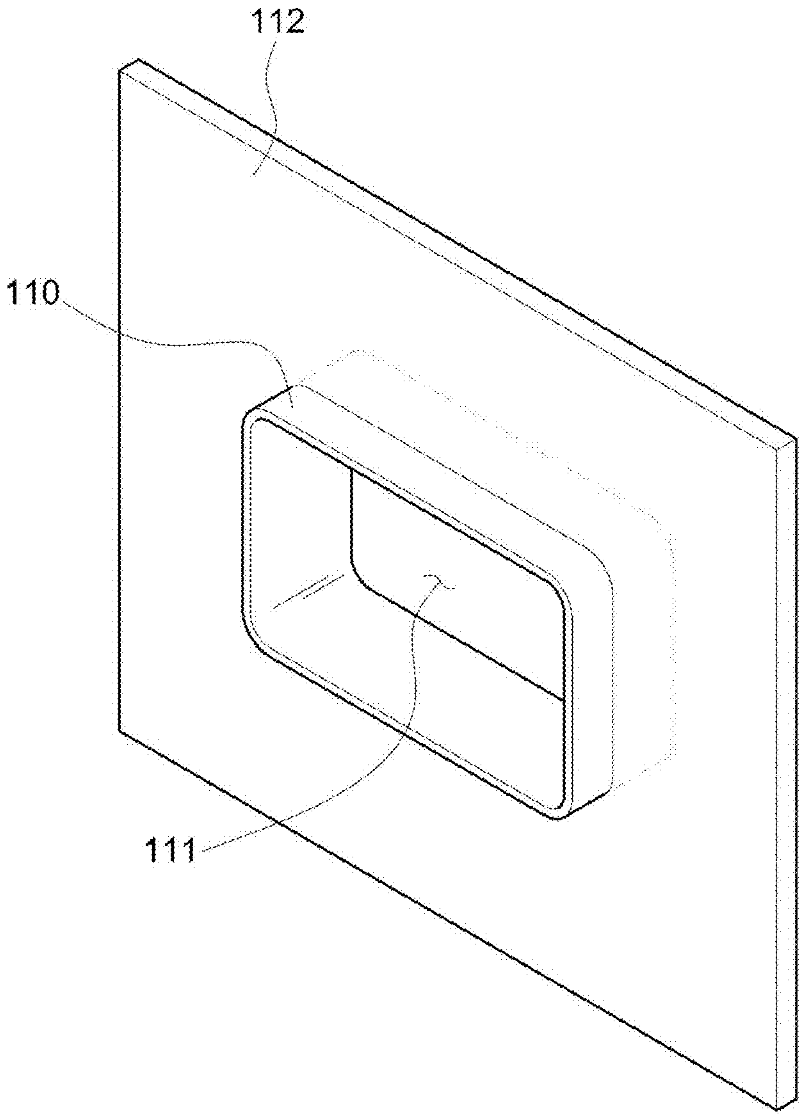

【FIG. 3】
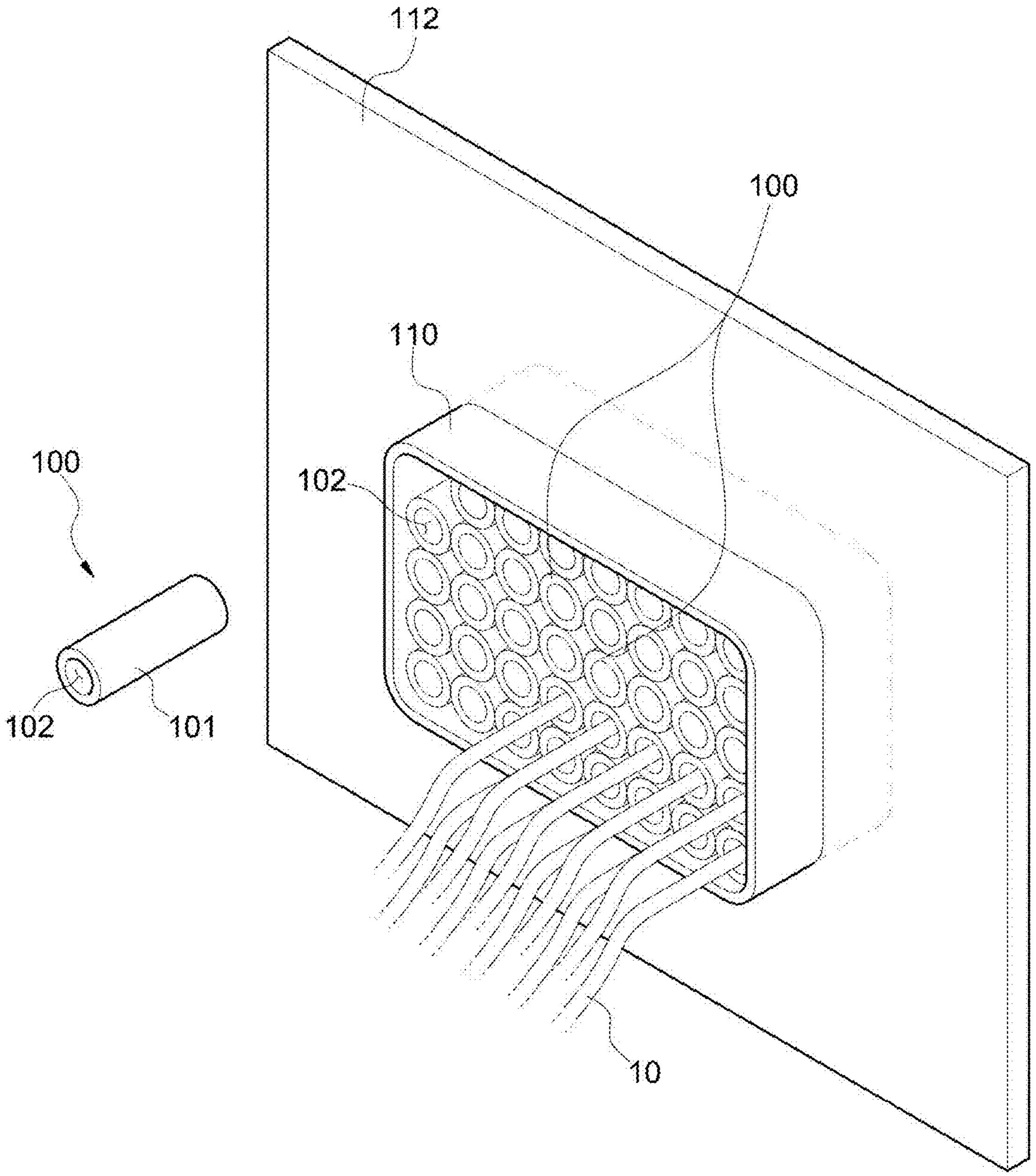

【FIG. 4】
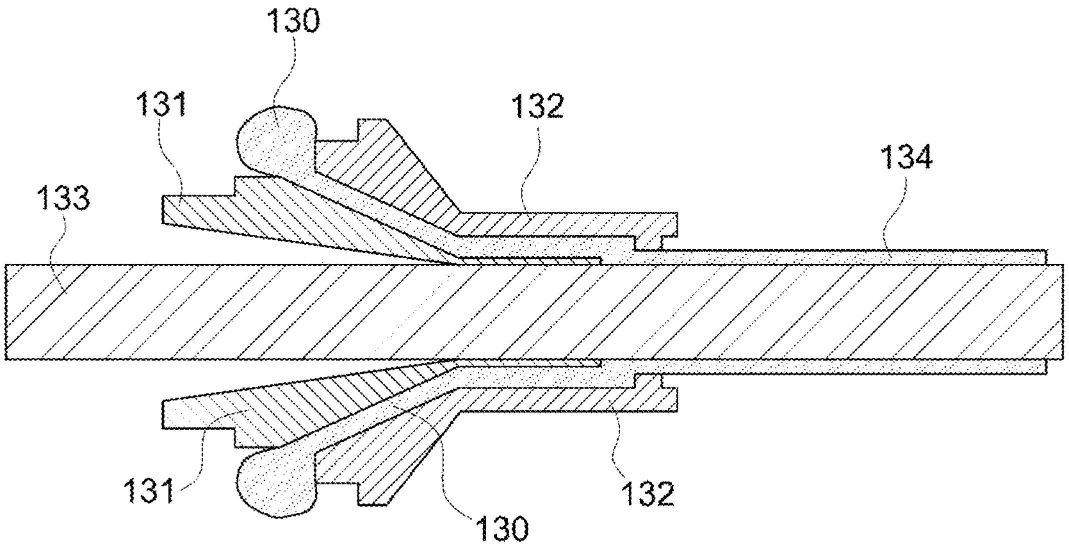

【FIG. 5】
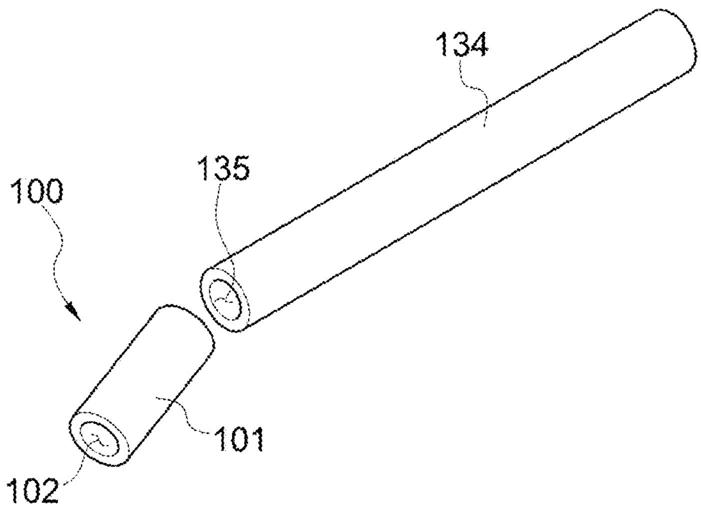

【FIG. 6】
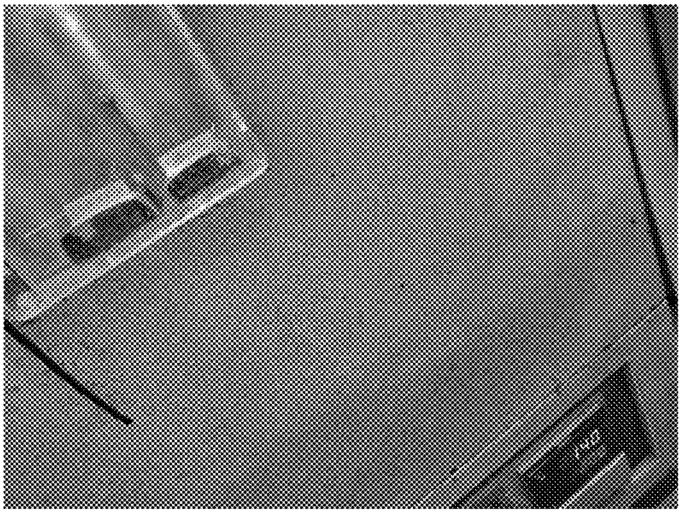
【FIG. 7】
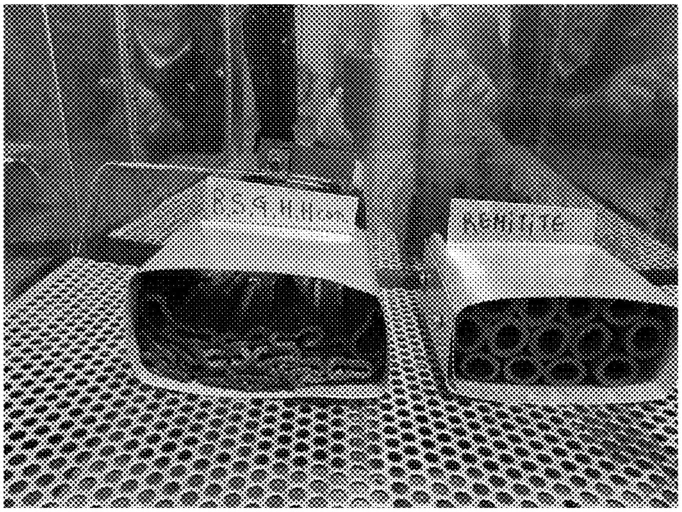

METHOD FOR MANUFACTURING FIRE-RESISTANT RESIN COMPOSITION, FIRE-RESISTANT MEMBER MANUFACTURED FROM FIRE-RESISTANT RESIN COMPOSITION, AND METHOD FOR MANUFACTURING FIRE-RESISTANT MEMBER

CROSS-REFERENCE TO RELATED APPLICATION(S)

This application is based on and claims priority under 35 U.S.C. 119 to Korean Patent Application No. 10-2024-0083346, filed on Jun. 26, 2024, in the Korean Intellectual Property Office, the disclosure of which is herein incorporated by reference in its entirety.

BACKGROUND OF THE INVENTION

1. Field of the Invention

The present disclosure relates to a method for manufacturing a fire-resistant resin composition, a fire-resistant member manufactured from the composition, and a method for manufacturing the fire-resistant member, wherein the fire-resistant member is installed in a wire penetration hole of a wall structure and, in the event of a fire, foams and expands by the heat of the fire to prevent the spread of the fire across the wall structure.

2. Description of the Prior Art

For the purposes of fluid sealing for joints, soundproofing, and heat insulation in buildings or industrial machines, liquid curable sealing materials, such as various kinds of coatings, foam materials, sealants, and molding materials, are widely used.

These sealing materials need to fill the gaps in the joints of a structure in order to achieve sufficient performance of fluid sealing, soundproofing, and heat insulation.

Thermally expandable, flame-retardant, silicone-based foam materials are used even in small quantities to seal one or more cables, pipes, ducts, and the like through a wall or a hole of a wall in areas requiring airtightness and water-tightness, such as wire or pipe penetration sites, through their expansion and insulation properties, in the event of a fire, and thus serve to protect property and lives.

More specifically, thermally expandable flame retardants are used to seal wall-penetrating holes such that, in the event of a fire, the retardants seal the holes to prevent the passage of flames and smoke through the wall, and preferably, prevent heat transfer.

Such a sealing material composed of a conventional foam material is applied in a compressed state into a necessary area and fills gaps of joints through the elastic force of the foam material itself.

However, conventional foam materials are elastically restored instantaneously upon pressure release, and thus foam materials or products using the same need to be applied to areas requiring fluid sealing, soundproofing, and heat insulation while maintaining a compressed state that withstands the restoring force of the foam materials, resulting in very poor workability.

In recent years, fire-resistant members are molded in a sleeve shape, and cables penetrating a wall are inserted into the fire-resistant members, so that in the event of a fire, the fire-resistant members perform sealing by thermal expansion due to heat, thereby preventing the spread of flames and smoke across the wall.

The sleeves need to be mounted around cables to at least a predetermined length (about 150 mm) in order to ensure sufficient performance thereof, but such a length restricts the locations where the sleeve can be installed.

Moreover, in the event of a fire, the sleeves may collapse in shape before undergoing thermal expansion, creating gaps through which flames and smoke may then spread.

PRIOR ART DOCUMENTS

Patent Documents

Korean Patent No. 10-1473260, "Expansion force by the fire with a resin composition and method of manufacture"

Korean Patent No. 10-0803466, "Thermally expandable material and method for producing the same"

Korean Patent Publication No. 10-2004-0019114, "Fire-resistant system and method for passing at least one cable, tube or the like through an opening in a wall"

SUMMARY OF THE INVENTION

The present disclosure has been made in order to solve the above-mentioned problems in the prior art and an aspect of the present disclosure is to provide a method for manufacturing a fire-resistant resin composition, a fire-resistant member manufactured from the fire-resistant resin composition, and a method for manufacturing the fire-resistant member, wherein a sleeve-shaped fire-resistant member, despite being molded with a short length, exhibits excellent fireproofing and heat insulation, hardly collapses in shape until the fire-resistant member reaches its foam temperature in the event of a fire, and allows mass production to lead to a reduction in production costs.

In accordance with an aspect of the present disclosure, there is provided a method for manufacturing a fire-resistant resin composition, the method including: a dissolution step of feeding 100 parts by weight of water, 10-30 parts by weight of pentaerythritol, 5-30 parts by weight of a melamine resin powder, and 30-60 parts by weight of ammonium polyphosphate (APP) into a tank, followed by heating at a temperature of 100° C. for 2-3 hours; a reaction step of further mixing 10-50 parts by weight of a liquid-phase urea resin, obtained by mixing 40-80 wt % of water and 20-60 wt % of a urea resin, and 0.2-1.0 parts by weight of ammonium chloride, relative to 30-60 parts by weight of ammonium polyphosphate, followed by stirring while boiling, thereby forming an APP-pentaerythritol polymer; an aging step of stopping stirring, followed by aging and curing at room temperature for 2-4 hours; a pulverization step of pulverizing the APP-pentaerythritol polymer in a lump form to a particle size of 100 to 300 mesh; and a mixing step of mixing 30-200 parts by weight of the APP-pentaerythritol polymer powder and 0.1-3.0 parts by weight of a platinum catalyst, relative to 100 parts by weight of a silicone resin.

In the mixing step, 5-30 parts by weight of graphite may be further mixed relative to 100 parts by weight of the silicone resin.

In the mixing step, 7-15 parts by weight of silicone oil may be further mixed relative to 100 parts by weight of the silicone resin.

In the mixing step, 1-5 parts by weight of epoxy silane may be further mixed relative to 100 parts by weight of the silicone resin.

In accordance with another aspect of the present disclosure, there is provided a fire-resistant member manufactured by extrusion-molding the fire-resistant resin composition manufactured by the method.

The fire-resistant member may be molded to have a sleeve shape with a length of 50-70 mm.

In accordance with still another aspect of the present disclosure, there is provided a method for manufacturing a fire-resistant member, wherein: the fire-resistant resin composition manufactured by the method is extruded, in a molten state, into a pipe shape between an outer die 132 and an inner die 131; a pole 133 is inserted into the inner die 131 along the central axis thereof, so that the fire-resistant resin composition is cured closely adhering to the outer surface of the pole 133 to form a sleeve-shaped molded product 134; and the molded product 134 is cut at predetermined intervals to manufacture fire-resistant members 100.

The fire-resistant resin composition and the fire-resistant members manufactured from the fire-resistant resin composition as a material therefor expand by the heat of a fire in the event of the fire to seal a specific penetration hole, thereby effectively preventing the spread of flames and smoke through the penetration hole.

Furthermore, the shape of the fire-resistant member is maintained until the fire-resistant member reaches its foam start temperature in the event of a fire, and this can prevent the spread of flames and smoke through gaps formed due to the shape collapse of the fire-resistant member before expansion.

Furthermore, the fire-resistant member of the present disclosure, despite being molded with a shorter length than existing sleeve-shaped fire-resistant members, can obtain sufficient fire resistance effects.

BRIEF DESCRIPTION OF THE DRAWINGS

The above and other aspects, features and advantages of the present disclosure will be more apparent from the following detailed description taken in conjunction with the accompanying drawings.

FIG. 1 is a perspective view of a fire-resistant member according to the present disclosure.

FIG. 2 is a perspective view of a coaming on which fire-resistant members are to be mounted.

FIG. 3 is a use state view illustrating that fire-resistant members according to the present disclosure are mounted on a coaming.

FIG. 4 is a cross-sectional view illustrating the extrusion molding of a fire-resistant member according to the present disclosure.

FIG. 5 is a view illustrating a manufacturing process of fire-resistant members by cutting an extruded molded product at predetermined intervals.

FIG. 6 shows the photograph of heating fire-resistant members in a heater.

FIG. 7 shows the photograph of the results whether the fire-resistant members of the example and the comparative example are collapsed in shape at temperature of 155° C. during heating up to 160° C.

DETAILED DESCRIPTION OF THE EXEMPLARY EMBODIMENTS

Hereinafter, the present disclosure will be described in detail with reference to preferable embodiments and attached drawing, and in the drawings, like reference numerals refer to like elements throughout.

Since the terms "comprising", "including", and "containing" can be construed as encompassing corresponding components unless specially described as opposite, it should be understood that they do not exclude other components but encompass other components. Unless defined otherwise, all technical and scientific terms have the same meanings as commonly understood by those skilled in the art to which the present disclosure belongs.

A resin composition according to the present disclosure employs raw materials where pentaerythritol, ammonium polyphosphate (APP), melamine and urea resins having an amino group ($—NH_2$), and ammonium chloride are mixed with water.

These materials are heated in boiling water and stirred in a boiling state, followed by reaction and subsequent aging, to obtain a cured material, which is called "APP-pentaerythritol polymer". This material exhibits both an expansion effect and a flame retardancy effect and is used as a basic raw material for an expandable flame-retardant composition.

The APP-pentaerythritol polymer can foam by heat even without a separate foaming agent, and undergoes the formation even with the use of small amount thereof, and thus can block flames and gas from adjacent walls in the event of a fire.

Additionally, the APP-pentaerythritol polymer serves to protect an expected damage place, by sealing one or more cables, pipes, ducts, and the like through holes in the wall such that the holes are sealed to prevent heat transfer.

Hereinafter, a method for manufacturing a fire-resistant resin composition of the present disclosure will be described.

Dissolution Step

A dissolution step is performed by feeding 100 parts by weight of water, 10-30 parts by weight of pentaerythritol (PE), 5-30 parts by weight of a powder type of melamine resin, and 30-60 parts by weight of a powder type of ammonium polyphosphate (APP) into a reactor tank for heating in boiling water, and dissolving the same by boiling at a temperature of 100° C. for 2-3 hours.

The melamine resin, which is a base, serves to cure and dry pentaerythritol.

In addition, ammonium polyphosphate, which is a phosphorus-based flame retardant, retains excellent thermal stability and a decomposition temperature of 250° C. or higher and thus is widely used as a flame retardant.

Reaction Step

After the dissolution step, 10-50 parts by weight of a liquid-phase urea resin and 0.2-1.0 parts by weight of ammonium chloride, relative to 30-60 parts by weight of ammonium polyphosphate, are fed into the tank.

The urea resin is in a liquid phase where 40-80 wt % of water is mixed with 20-60 wt % of a urea resin, and ammonium chloride is fed in a powder state into the tank.

In addition, these are reacted with stirring at a rate of 30-60 rpm for 20 minutes while boiling.

The mixing of the liquid-phase urea resin produces the effect of agglomerating the mixed materials and improving water resistance, and maintains the shape of the fire-retardant resin without becoming mushy when the fire-retardant resin is thermally expanded. Less than 10 parts by weight of the liquid-phase urea resin cannot maintain the shape of the fire-resistant resin upon thermal expansion, and more than 50 parts by weight shows a poor fire-resistant performance. Therefore, the liquid-phase urea resin is mixed in a content of 10-50 parts by weight.

Ammonium chloride serves to cure the liquid-phase urea resin.

Through the reaction step, ammonium polyphosphate (APP) reacts with pentaerythritol (PE) to form an APP-pentaerythritol polymer.

Aging Step

When the reaction occurs in the reaction step, an aging step is performed wherein stirring is stopped, followed by aging and curing at room temperature for 2-4 hours.

The APP-pentaerythritol polymer becomes cured through the aging step.

Pulverization Step

The APP-pentaerythritol polymer in a lump form obtained through the reaction step and the aging step is pulverized to a size of 100-300 mesh.

Mixing Step

The APP-pentaerythritol polymer, pulverized in a powder form in the pulverization step, is mixed with a resin and a catalyst to form a fire-resistant resin composition 130 according to the present disclosure.

A silicone resin is mixed as the resin, and a platinum catalyst is mixed as the catalyst, wherein 30-200 parts by weight of the APP-pentaerythritol polymer powder and 0.1-3.0 parts by weight of the platinum catalyst are mixed relative to 100 parts by weight of the silicone resin.

A silicone resin with a viscosity of 1,000-50,000 cps is used for workability. The silicone resin serves to maintain the shape of a fire-resistant member, which is to be later molded as a product, before the fire-resistant member thermally expands by the heat of a fire.

The APP-pentaerythritol polymer is mixed in a content of 30-200 parts by weight relative to 100 parts by weight of the silicone resin. If the APP-pentaerythritol polymer is mixed in a content of less than 30 parts by weight, the expandability and insulation properties required for the fire-resistant member cannot be ensured, and if the APP-pentaerythritol polymer is mixed in a content of more than 200 parts by weight, the fire-resistant member to be molded as a product t may collapse in shape before undergoing expansion by the heat of a fire.

Therefore, the APP-pentaerythritol polymer is preferably mixed in a content of 30-200 parts by weight relative to 100 parts by weight of the silicone resin.

The platinum catalyst serves to cure the silicone resin.

The platinum catalyst is mixed in a content of 0.1-3.0 parts by weight relative to 100 parts by weight of the silicone resin. If the platinum catalyst is mixed in a content of less than 0.1 parts by weight, the curing of the resin is poorly accomplished, resulting in a reduction in productivity, and if the platinum catalyst is mixed in a content of more than 3.0 parts by weight, silicone is cured too quickly, resulting in poor workability and moldability.

In an embodiment of the present disclosure, the platinum catalyst is used as a silicone resin curing agent, but a copper catalyst may be used instead of the platinum catalyst.

In the mixing step, a powder form of graphite is preferably further mixed.

The mixing of graphite with a mixture of the APP-pentaerythritol polymer and the silicone resin improves heat insulation and expandability of the mixture since graphite particles absorb a part of heat in the event of a fire.

This graphite is preferably mixed in a content of 5-30 parts by weight relative to 100 parts by weight of the silicone resin.

The mixing of less than 5 parts by weight of graphite relative to 100 parts by weight of the silicone resin shows insignificant effects in terms of improvement of heat insulation and expandability, and the mixing of more than 30 parts by weight of graphite causes the shape collapse of the mixture composition before expansion by the heat of a fire, and thus the graphite is preferably mixed in a content of 5-30 parts by weight relative to 100 parts by weight of the silicone resin.

For uniform mixing of the silicone resin with other materials, 7-15 parts by weight of silicone oil is preferably further mixed relative to 100 parts by weight of the silicone resin, and for enhancement of the binding strength of materials to be mixed, 1-5 parts by weight of epoxy silane is preferably further mixed relative to 100 parts by weight of the silicone resin.

The above-described fire-resistant resin composition is used to manufacture a fire-resistant member 100. As shown in FIG. 1, the fire-resistant member 100 according to the present disclosure has a cylindrical body 101 and a hole 102 with a predetermined diameter is formed in the center of the body 101 along the axial direction thereof, and thus the first-resistant covering 100 is molded in a sleeve shape.

A fire-resistant resin composition 130 manufactured by the above-described fire-resistant resin composition manufacturing method is extrusion molded to manufacture the fire-resistant member 100.

As shown in FIG. 4, the fire-resistant resin composition 130 is extruded between an inner die 131 and an outer die 132 in ring shapes and molded into a pipe shape.

Particularly, as shown in FIG. 4, a rod 133 with a predetermined length is continuously introduced into the inner die 131, so that the extrusion-molded fire-resistant resin composition 130 is extruded onto the outer surface of the rod 133, and after the extrusion molding, the extrusion-molded fire-resistant resin composition 130 remains supported on the rod 133 until cured, thereby maintaining the pipe shape.

The rod 133 is continuously supplied into the inner die 131 while the fire-resistant resin composition 130 is extrusion-molded.

When the rod 133 is removed from a molded product 134 after the curing of the extrusion-molded fire-resistant resin composition 130, a hole 135 is formed in the center of the molded product 134 along the axial direction, as shown in FIG. 5.

Subsequently, as shown in FIG. 5, the molded product 134 is cut at each predetermined length to manufacture sleeve-shaped fire-resistant members 100, each of which has a hole 102 in the center of the body 101 along the axial direction, as shown in FIG. 1.

Especially, the fire-resistant members 100 are preferably cut with a length of 50-70 mm.

Conventional fire-resistant members in a sleeve shape were molded to be about 150 mm long for sufficient fire resistance performance, whereas the fire-resistant members 100 of the present disclosure can retain sufficient fire resistance performance even though molded shorter than conventional fire-resistant members, leading to a high degree of installation freedom.

FIG. 2 is a perspective view of a coaming of a ship. A coaming 110 is formed on a flange 112, and a penetration hole 111 passing through the flange 112 is formed in the coaming 110.

Various cables pass through the penetration hole 111 of the coaming 110 across the wall of the ship. As shown in FIG. 3, the fire-resistant members 100 are inserted into the penetration hole 111 so as to prevent the spread of flames through the penetration hole 111 of the coaming 110 in the event of a fire.

The fire-resistant members 100 and cables 10 are installed in the penetration hole 111 of the coaming 110 such that the cables 10 are inserted into the holes 102 of the fire-resistant members 100 inserted into the penetration hole 111 of the coaming 110 or the cables 10 are located between a fire-resistant member 100 and a fire-resistant member 100.

Although not shown, after the completion of the installation of the fire-resistant members 100 and the cables in the coaming 110, the penetration hole 111 is sealed by applying a sealant to both side ends of the fire-resistant members 100—both sides of the penetration hole 111 of the coaming 110.

In the event of a fire in any one section of the ship in a state where the fire-resistant members 100 have been installed in the coaming 110 as described above, flames and smoke may spread to other sections along the cables 10 passing through the coaming 110, but the fire-resistant members 100 foam by the heat of the fire to compress the cables 10 and thus completely closing the penetration hole 111 of the coaming 110, thereby preventing the spread of flames and smoke to the other sections.

Since conventional fire-resistant members were molded to have a length of 150 mm or longer for effective fire resistance performance, the coaming 110 accommodating the fire-resistant members became longer, causing a large protrusion of the coaming 110 from the wall.

Since the fire-resistant resin composition of the present disclosure possess excellent expandability, heat resistance, and heat insulation thereof, the fire-resistant members can exhibit effective fire resistance performance even though molded as short as 50-70 mm in length.

The fire-resistant members expand at a temperature of about 160° C. in the event of a fire, thereby closing the penetration hole 111, but conventional fire-resistant members collapsed in shape before reaching their expansion temperature, failing to properly perform their role.

The fire-resistant members 100 of the present disclosure can maintain the shape thereof even until the fire-resistant members reach their expansion temperature, thereby preventing the spread of flames and smoke.

EXAMPLE

Into a tank, 100 parts by weight of water, 20 parts by weight of pentaerythritol, 20 parts by weight of a melamine resin powder, and 35 parts by weight of ammonium polyphosphate were fed, followed by heating at a temperature of 100° C. for 3 hours.

Subsequently, 30 parts by weight of a liquid-phase urea resin, obtained by mixing 60 wt % of water and 40 wt % of a urea resin, and 0.6 parts by weight of ammonium chloride were fed into the tank, and then these were stirred at a rate of 40 rpm for 20 minutes while boiling. Upon the completion of the stirring, the stirred material was aged and cured at room temperature for 4 hours, thereby an APP-forming pentaerythritol polymer.

The APP-pentaerythritol polymer in a lump form was pulverized to a size of 200 mesh.

A fire-resistant resin composition was manufactured by mixing 100 parts by weight of a silicone resin with a viscosity of 20,000 cps, 120 parts by weight of the APP-pentaerythritol polymer, 2 parts by weight of the platinum catalyst, 20 parts by weight of a graphite powder, 10 parts by weight of silicone oil, and 2 parts by weight of epoxy silane.

The fire-resistant resin composition was molten and extrusion-molded into a pipe shape with an outer diameter of 20 mm, an inner diameter of 14 mm, and a length of 60 mm, thereby manufacturing fire-resistant members.

COMPARATIVE EXAMPLE

Into a tank, 100 parts by weight of water, 20 parts by weight of pentaerythritol, 20 parts by weight of a melamine resin powder, and 35 parts by weight of ammonium polyphosphate were fed, followed by heating at a temperature of 100° C. for 3 hours.

Subsequently, 30 parts by weight of a liquid-phase urea resin, obtained by mixing 60 wt % of water and 40 wt % of a urea resin, and 0.6 parts by weight of ammonium chloride were fed into the tank, and then these were stirred at a rate of 40 rpm for 20 minutes while boiling. Upon the completion of the stirring, the stirred material was aged and dried at room temperature for 4 hours, thereby an forming APP-pentaerythritol polymer.

The APP-pentaerythritol polymer in a lump form was pulverized to a size of 200 mesh.

The fire-resistant resin composition was molten and extrusion-molded into a pipe shape with an outer diameter of mm, an inner diameter of 14 mm, and a length of 60 mm, thereby manufacturing fire-resistant members.

FIG. 6 shows the photograph of heating fire-resistant members in a heater.

FIG. 7 shows the photograph of the results whether the fire-resistant members of the example and the comparative example are collapsed in shape at temperature of 155° C. during heating up to 160° C.

It was observed whether the fire-resistant members of the example and the comparative example collapsed in shape during heating up to 160° C., which is the expansion temperature of the APP-pentaerythritol polymer.

As shown in FIG. 7, the fire-resistant members of the comparative example (left on the image, B.S.G.H.H con) were collapsed at a temperature of 140° C. before reaching 160° C., which is the foaming start temperature of the APP-pentaerythritol polymer, but the fire-resistant members of the present example (right on the image, REMiTiTE) maintained their shape until the fire-resistant members reach their foaming temperature.

If the fire-resistant members of the comparative example are installed in a penetration hole in a wall, the fire-resistant members may collapse in shape before reaching their expansion temperature, in the event of a fire, resulting in a wide space in the penetration hole, through which flames and smoke can spread.

However, the fire-resistant members of the example maintain their original shape before reaching their foaming temperature, in the event of a fire, and thus can effectively prevent flames and smoke through normal foaming.

Hereinabove, the technical spirit of the present disclosure has been described.

It would be obvious that a person skilled in the art to which the present disclosure pertains can variously change or modify the above-described embodiments from the description of the present disclosure.

Although not clearly described or shown, it would be obvious that a person skilled in the art to which the present disclosure pertains can implement various types of modification including the technical spirit of the present disclosure from the description of the present disclosure, which still belong to the scope of the present disclosure.

The above embodiments described with reference to the accompanying drawings have been provided in order to explain the present disclosure, and the scope of the present disclosure is not limited to these embodiments.

What is claimed is:

1. A method for manufacturing a fire-resistant resin composition, the method comprising:

a dissolution step of feeding 100 parts by weight of water, 10-30 parts by weight of pentaerythritol (PE), 5-30 parts by weight of a melamine resin powder, and 30-60 parts by weight of ammonium polyphosphate (APP) into a tank, followed by heating at a temperature of 100° C. for 2-3 hours, where the parts by weight of the PE, the melamine resin powder, and the APP are relative to the 100 parts by weight of the water;

a reaction step of further mixing 10-50 parts by weight of a liquid-phase urea resin, where the liquid-phase urea resin is obtained by mixing 40-80 wt % of water and 20-60 wt % of a urea resin based on a total weight of the liquid-phase urea resin, and 0.2-1.0 parts by weight of ammonium chloride into the tank, where the parts by weight of the liquid-phase urea resin and the ammonium chloride are relative to the 30-60 parts by weight of the ammonium polyphosphate used in the dissolution step, followed by stirring while boiling, thereby forming an APP-pentaerythritol polymer mixture;

an aging step of stopping stirring, followed by aging and curing the APP-pentaerythritol polymer mixture at room temperature for 2-4 hours to obtain an APP-pentaerythritol polymer lump;

a pulverization step of pulverizing the APP-pentaerythritol polymer lump to a particle size of 100 to 300 mesh to obtain an APP-pentaerythritol polymer powder; and a mixing step of mixing 100 parts by weight of a silicone resin, 30-200 parts by weight of the APP-pentaerythritol polymer powder, and 0.1-3.0 parts by weight of a platinum catalyst, where the parts by weight of the APP-pentaerythritol polymer powder and the platinum catalyst are relative to the 100 parts by weight of the silicone resin.

2. The method of claim 1, wherein in the mixing step, 5-30 parts by weight of graphite is further mixed relative to 100 parts by weight of the silicone resin.

3. The method of claim 1, wherein in the mixing step, 7-15 parts by weight of silicone oil is further mixed relative to 100 parts by weight of the silicone resin.

4. The method of claim 1, wherein in the mixing step, 1-5 parts by weight of epoxy silane is further mixed relative to 100 parts by weight of the silicone resin.

* * * * *